United States Patent [19]

Waldo

[11] Patent Number: 4,815,117
[45] Date of Patent: Mar. 21, 1989

[54] CUSHIONING BITE PLATE ADAPTER FOR X-RAY FILM HOLDER

[76] Inventor: Patricia J. Waldo, Ben Franklin House, Apt. 924, 9th & Chestnut Sts., Philadelphia, Pa. 19107

[21] Appl. No.: 92,167

[22] Filed: Sep. 2, 1987

[51] Int. Cl.⁴ .......................... A61B 6/14; G03B 42/02
[52] U.S. Cl. ..................................... 378/168; 378/170
[58] Field of Search ................................. 378/167–170

[56] References Cited

U.S. PATENT DOCUMENTS

| | | |
|---|---|---|
| 1,012,561 | 12/1911 | Ketcham . |
| 1,571,145 | 4/1924 | Schlappi . |
| 1,585,264 | 5/1922 | Rosenthal . |
| 1,899,877 | 2/1930 | Martin . |
| 2,010,281 | 1/1934 | Valkenburg . |
| 2,021,190 | 10/1934 | Malkasian . |
| 2,736,814 | 3/1952 | Lederman et al. . |
| 2,786,947 | 3/1956 | Lieberman . |
| 3,003,062 | 11/1959 | Updegrave ........................... 378/170 |
| 3,444,371 | 3/1966 | Via, Jr. . |
| 3,473,026 | 7/1966 | Updegrave ........................... 378/170 |
| 3,510,652 | 5/1970 | Greene et al. ........................ 378/168 |
| 3,777,141 | 12/1973 | Eggen . |
| 3,936,643 | 2/1976 | Toner . |
| 4,593,401 | 6/1986 | Colbert . |
| 4,707,847 | 11/1987 | Van Aken ........................... 378/170 |

Primary Examiner—Carolyn E. Fields
Assistant Examiner—Joseph A. Hynds
Attorney, Agent, or Firm—Benasutti and Murray

[57] ABSTRACT

A cushioning bite plate adapter for use with a dental x-ray film holder comprises an elastically compressible member which has an attachment surface for engaging a surface of a bite plate of the film holder. An adhesive layer is disposed on the attachment surface of the elastically compressible member. A protective peel-off sheet is disposed over the adhesive layer. To use, the protective peel-off sheet is removed and the adhesive layer on the attachment surface is pressed into contact with the bite plate surface. The adhesive layer maintains the elastically compressible member in contact with the bite plate surface. Following use, the adapter is separated from the bite plate surface and thrown away.

19 Claims, 1 Drawing Sheet

CUSHIONING BITE PLATE ADAPTER FOR X-RAY FILM HOLDER

BACKGROUND OF THE INVENTION

This invention relates to devices for use in the practice of dentistry and more particularly to dental x-ray film holding devices. The primary function of such devices is to hold x-ray film securely and in proper alignment with the teeth, and in some cases in proper alignment with both the teeth and the x-ray apparatus during x-ray procedures. While in the past, some devices have employed dental impression type materials to maintain the alignment of the x-ray film (as in U.S. Pat. No. 1,899,877) or to help secure the x-ray holder in the mouth (as in U.S. Pat. No. 1,585,264); contemporary, x-ray film holding devices generally rely on the patient's ability to maintain a steady bite on the x-ray film holder to achieve these objectives. The present invention relates to holders of this latter type.

X-ray holders which are presently available possess a number of shortcomings. Most are uncomfortable and none adequately account for the effect of patient comfort and bite pressure on the quality of the x-ray negatives produced.

In order to explain the deficiencies in the present art, it is first necessary to define terms of compressibility. For purposes of this specification and claims, a material will be said to be compressible if, in the range of compressive pressures typical of a dental patient's bite, a material will be substantially compressed in its linear dimension, as measured along a line perpendicular to the pressure imparting surfaces. A material will be said to be incompressible if, in the range of compressive pressures typical of a patient's bite, the material will not be substantially compressed in its linear dimension, as measured along a line perpendicular to the pressure imparting surfaces. A material will be said to be elastically compressible if, upon a relaxation of compressive pressure, the compressed material will recover its original linear dimension with little or no hysteresis. Finally, a material will be said to be deformably compressible if, upon a relaxation of compressive pressure, the compressed material will experience significant hysteresis.

The one-piece x-ray holders such as those described in U.S. Pat. Nos. 3,444,371 and 3,936,643 are deficient in that their structure is, for all practical purposes, completely defined by a single elastically compressible material. Because these holders must function both as film holder and bite plate, the material of construction must be sufficiently rigid to maintain a predetermined alignment of x-ray film and holder, while at the same time be sufficiently elastically compressible to allow the device to be gripped securely by the teeth. The compromise necessary to serve these two desired ends with but a single structural component, results in an x-ray holder which serves neither desired end well. A further shortcoming of these one-piece holders is that none are designed to function cooperatively with the latest generation of x-ray equipment which utilizes x-ray cone positioning devices. A further shortcoming of the one-piece holder is that either the whole unit must be disposable, which can be costly; or the whole unit must be designed to maintain its structural integrity and compressibility in the face of repeated sterilization. Both of these limitations are costly, and the latter places a severe constraint on the scope of possible materials of construction.

SUMMARY OF THE INVENTION

The cushioning bite plate adapter of the present invention comprises a disposable member of elastically compressible material which may be removably attached to a bite plate of a dental x-ray film holder such that in use the elastically compressible member will be interposed between the patient's biting surfaces and the bite plate. It is removeably attached to the bite plate by any suitable means such as an adhesive. The disposable member is dimensioned to conviently mate with the x-ray film holder while providing a cushion between the film holder and the patient's mouth. Because the bite plate, and not the elastically compressible member, is relied upon for structural integrity, a wide variety of soft cushioning materials may be used for the elastically compressible member. These include but are not limited to polyurethane foam, or other similar compressible material.

Combining of an elastically compressible member with an incompressible bite plate, affords the patient greater comfort, and provides for improved positional stability of the bite plate, and concomitant stability of the film holder, under reasonably wide variations in bite pressure. For example, in the face of either momentary or continuing reduced bite pressure, the elastically compressibly member will remain pressure conforming to the patient's biting surfaces. As a result the x-ray holder will remain secure and in proper x-ray alignment. In contrast, in the face of either momentary or continuing low bite pressure, a bite plate of either incompressible or deformably compressible material will not remain in pressure contact with the biting surfaces, and proper x-ray alignment and stability may be compromised.

Further, because the elastically compressible member can be made from a wide variety of currently available materials, and may be small and uncomplicated in comparison to the x-ray holder device, the member is inexpensive to produce and easy to replace and may therefore be made disposable. In addition, since the elastically compressible member is disposable, chance of disease transmission from patient to patient is substantially reduced. Moreover, the choice of materials of construction need not be limited to those which are resistant to repeated sterilization.

An additional advantage of the elastically compressible member is that it may be used in combination with any of a broad spectrum of x-ray holder devices ranging from stand alone disposable, one-piece x-ray holders such as shown in U.S. Pat. Nos. 3,444,371 and 3,936,964 to holders that are reuseable and sterilizable, and which incorporate aiming devices typical of the latest generation of x-ray equipment.

DETAILED DESCRIPTION OF THE DRAWINGS

Figures 1, 2:
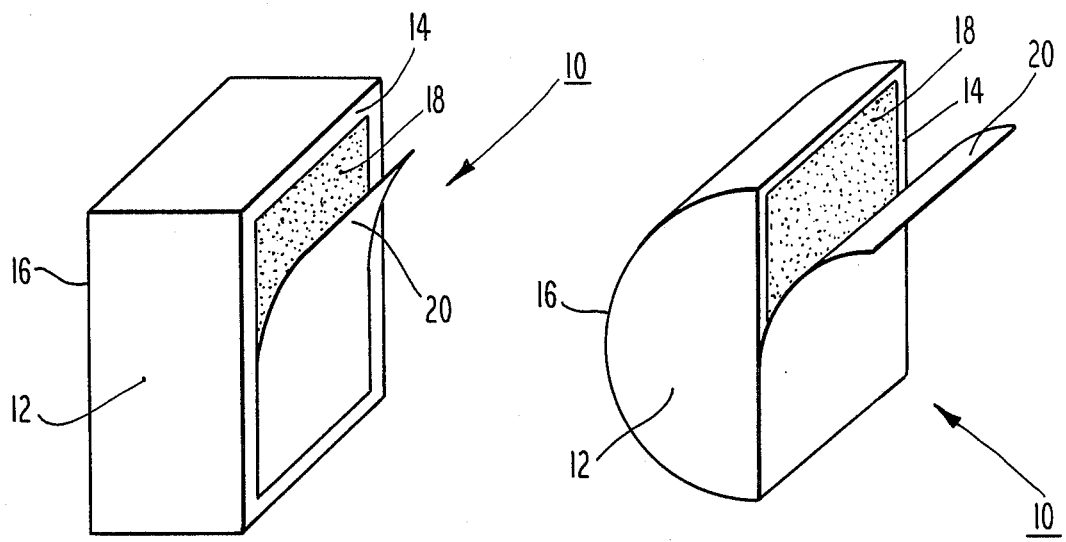
FIG. 1 is a perspective view of a preferred embodiment of a cushioning bite plate adapter in accordance with the present invention.
FIG. 2 is a perspective view of an alternate preferred embodiment of the cushioning bite plate adapter in accordance with the present invention.

Referring now to FIG. 1, a preferred embodiment of the cushioning bite plate adapter of the present invention, generally designated 10, comprises an elastically compressible member 12 having an attachment surface 14 opposite a cushioning surface 16. The elastically compressible member 12 can be constructed of any elastically compressible material such as, by way of example and not limitation, polyurethane foam. Releasable attaching means is disposed on the attachment surface 14. In the preferred embodiment, the attachment means is a layer of adhesive material 18 disposed on the attachment surface 14. The adhesive material 18 is preferrably covered by a protective peel-off sheet 20. Although the attaching means is preferrably an adhesive, it could also be a strip of velcro material or any other material which will provide releasable attachment to a biting surface of an x-ray film holder.

The elastically compressible member 12 may be of any convenient shape that is dimensionally compatible with the x-ray film holder with which it will be used; and which presents a comfortable surface to the teeth, gums and other portions of the patient's mouth which come into contact with the x-ray film holder and provides a cushion thereagainst. In one preferred embodiment, the elastically compressible member 12 has a substantially rectangular shape as shown in FIG. 1. In an alternate preferred embodiment, the elastically compressible member 12 has a curved rectangular solid shape with a curved cushioning surface 11 and a substantially planar attachment surface 14 as shown in FIG. 2. The thickness of the elastically compressible member 12 may be of any suitable dimension which fits within the mating envelope of the x-ray film holder and affords protection and comfort to the patient.

Figure 3:
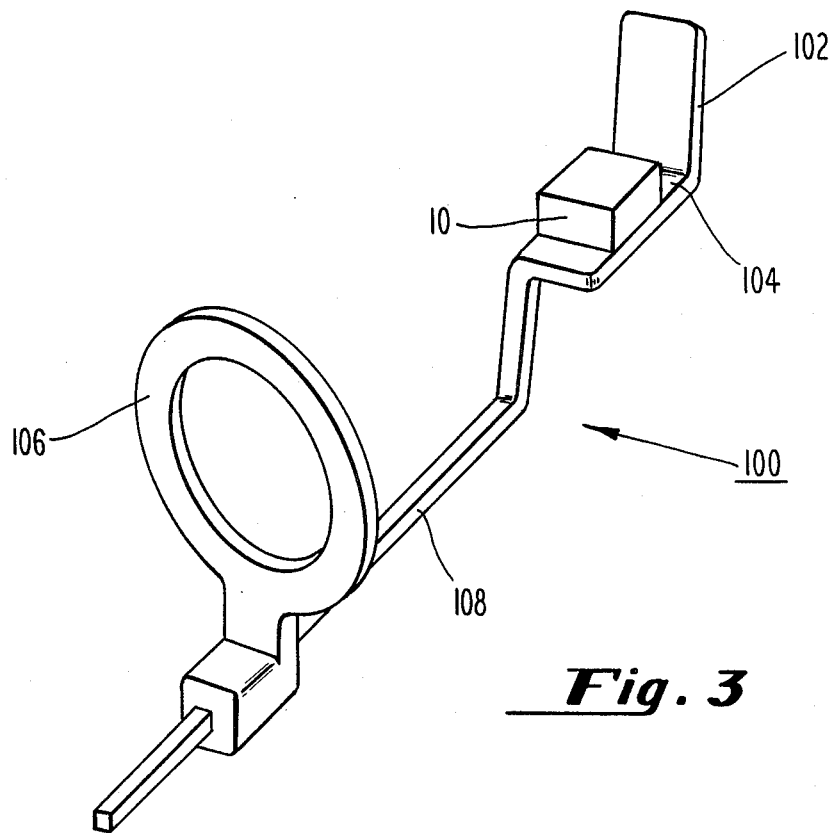
FIG. 3 is a perspective view of the cushioning bite plate adapter depicted in FIG. 1 attached to an x-ray film holder having an X-ray cone positioning device.

Referring now to FIG. 3 there is shown the bite plate adapter 10 in combination with a sterilizable x-ray film holder generally designated 100. The film holder 100 comprises a film retainer 102 which is attached to a bite plate 104. An x-ray cone positioning device 106 is slideably attached to a frame member 108 which is rigidly attached to the bite plate 104. The bite plate adapter 10 is releasably attached to the bite plate 104 by means of the adhesive layer 18 (see FIGS. 1 and 2). The bite plate adapter 10 is positioned on the bite plate 104 such that during use, the adapter 10 will be interposed between the patient's biting surfaces (not shown) and the bite plate 104.

Although FIG. 3 depicts a single bite plate adapter 10 attached to a top surface of the bite plate 104, the adapter 10 may be attached to the bottom surface of the bite plate 104, or two adapters 10 may be used, one attached to the top surface and the other attached to the bottom surface of the bite plate 104 in order to afford protection and comfort with respect to the patient's opposing biting surfaces. The use of two adapters 10 on the upper and lower surfaces as well as one adapter 10 on either the upper surface or the lower surface of the bite plate 104 is considered to be within the scope and contemplation of the present invention.

In use, it is preferred that each bite plate adapter 10 is furnished in a disposable package, which can be constructed such that it keeps the contents sterile if it is desired to furnish the adapter 10 in a sterile condition. The package is opened and the adapter 10 removed. The protective peel-off sheet 20 is removed from the adhesive layer 18. The adapter 10 is then positioned on the bite plate 104 of the film holder 100 such that the adhesive layer 18 contacts the desired surface of the bite plate 104. The compressible member 12 pressed into contact thereto such that it is retained on the bite plate 104 by the adhesive layer 18. If it is desired to use two adapters 10, one is pressed into contact with the upper surface of the bite plate 104 and the other is pressed into contact with its lower surface.

The film retainer 102 and bite plate 104 portions of the film holder 100 are placed within the patient's mouth in the desired position. The patient then bites down upon the adapter or adapters 10 in order to maintain the X-ray film holder 100 in the correct position. The X-ray cone (not shown) is placed into position with respect to the X-ray cone positioning device 106. The X-ray film, which is held by the film retainer 102, is then exposed.

Upon completion of the X-ray procedure, the film retainer 102 and bite plate 104, with adapters 10 attached thereto, are withdrawn from the patient's mouth. The adapters 10 are removed from the bite plate 104 and thrown away. The X-ray film holder 100 is then cleaned and sterilized thereby putting it into condition for reuse.

As can be seen from the above description, use of the cushioning bite plate adapters 10 in accordance with the present invention affords the patient greater comfort and provides for improved positional stability of the X-ray film holder 100 under reasonably wide variations of bite pressure. The adapters 10 are inexpensive, easy to install and replace, and disposable thereby substantially reducing the possibility of disease transmission from patient to patient. It should be noted that the cushioning bite plate adapters 10 of the present invention are particularly suited for use with patients having missing teeth. The adapters 10 provide comfort, and therefore enhance stability of the x-ray film holder, by providing a cushioned surface between the patient's gums and the bite plate 104.

It will be understood that various changes in the details, materials and arrangement of the parts which have been herein described and illustrated in order to explain the nature of this invention, may be made by those skilled in the art within the principle and scope of the invention as expressed in the following claims.

I claim:

1. A cushioning bite plate adapter for use with a dental x-ray film holder, said adapter comprising:
   (a) an elastically compressible member having a single attachment surface; and
   (b) releasable attaching means disposed on said single attachment surface for engaging a single surface of a bite plate of said x-ray film holder.

2. The adapter in accordance with claim 1 wherein said releasable attaching means comprises a layer of adhesive material disposed on said attachment surface.

3. The adapter in accordance with claim 2 wherein said layer of adhesive material is covered by a protective peel-off sheet.

4. The adapter in accordance with claim 3 wherein said elastically compressible member has a substantially rectangular shape.

5. The adapter in accordance with claim 3 wherein said elastically compressible member has a curved rectangular solid shape with a curved cushioning surface and a substantially planar attachment surface.

6. The adapter in accordance with claim 3 wherein said electrically compressible member comprises a foamed plastic material.

7. The adapter in accordance with claim 6 wherein said foamed plastic material comprises polyurethane foam.

8. In combination with a dental x-ray film holder including a film retainer having a bite plate attached thereto, a cushioning bite plate adapter including means for removable attachment of a single adapter surface to a single surface of said bite plate.

9. The combination in accordance with claim 8 wherein said means for removable attachment is attached to said bite plate surface by adhesive means.

10. The combination in accordance with claim 9 wherein said adapter has a substantially rectangular shape.

11. The combination in accordance with claim 9 wherein said adapter has a curved rectangular solid shape, with a curved cushioning surface and a substantially planar attachment surface which removeably mates with said bite plate surface.

12. The combination in accordance with claim 9 wherein said adapter includes an elastically compressible member comprising a foamed plastic material.

13. The combination in accordance with claim 12 wherein said foamed plastic material comprises polyurethane foam.

14. An apparatus for use in positioning x-ray film within a patient's mouth and positioning x-ray equipment in alignment with said x-ray film, said apparatus comprising:
    (a) an x-ray film holder;
    (b) a bite plate attached to said film holder;
    (c) a frame attached to said bite plate;
    (d) anx-ray cone positioning device slidably attached to said frame; and
    (e) a cushioning adapted including means for removable attachment of single adapter surface to a single surface of said bite plate.

15. The apparatus in accordance with claim 14 wherein said cushioning adapter comprises
    (i) an elastically compressible member having an attachment surface which engages the surface of said bite plate; and
    (ii) adhesive means for maintaining said attachment surface in engagement to the surface of said bite plate.

16. The apparatus in accordance with claim 15 wherein said elastically compressible member has a substantially rectangular solid shape.

17. The apparatus in accordance with claim 15 wherein said elastically compressible member has a curved rectangular solid shape with a curved cushioning surface and a substantially planar attachment surface.

18. The apparatus in accordance with claim 15 wherein said elastically compressible member comprises a foamed plastic.

19. The apparatus in accordance with claim 18 wherein said foamed plastic comprises polyurethane foam.

* * * * *

UNITED STATES PATENT AND TRADEMARK OFFICE
CERTIFICATE OF CORRECTION

PATENT NO. : 4,815,117

DATED : March 21, 1989

INVENTOR(S) : Patricia J. Waldo

It is certified that error appears in the above-identified patent and that said Letters Patent is hereby corrected as shown below:

Column 6, line 8, the word " adapted" should read --adapter--.

Column 6, line 9, the word "single" should be preceded by the word --a--.

Signed and Sealed this

Twenty-seventh Day of February, 1990

Attest:

JEFFREY M. SAMUELS

*Attesting Officer*  *Acting Commissioner of Patents and Trademarks*